Oct. 3, 1939.　　　　　L. GUGALA　　　　　2,174,721
AUTOMATIC MACHINE FOR BEVELING GLASS
Filed April 2, 1938　　　9 Sheets-Sheet 1

Inventor
Louis Gugala.
Daniel Brennan
Attorney

Oct. 3, 1939. L. GUGALA 2,174,721
AUTOMATIC MACHINE FOR BEVELING GLASS
Filed April 2, 1938 9 Sheets-Sheet 2

Inventor.
Louis Gugala.
Daniel Brennan
Attorney.

Oct. 3, 1939.　　　　L. GUGALA　　　　2,174,721
AUTOMATIC MACHINE FOR BEVELING GLASS
Filed April 2, 1938　　　9 Sheets-Sheet 4

Inventor.
Louis Gugala
Daniel Brennan
Attorney.

Oct. 3, 1939.  L. GUGALA  2,174,721
AUTOMATIC MACHINE FOR BEVELING GLASS
Filed April 2, 1938  9 Sheets-Sheet 5

Inventor.
Louis Gugala.
Daniel Brennan
Attorney.

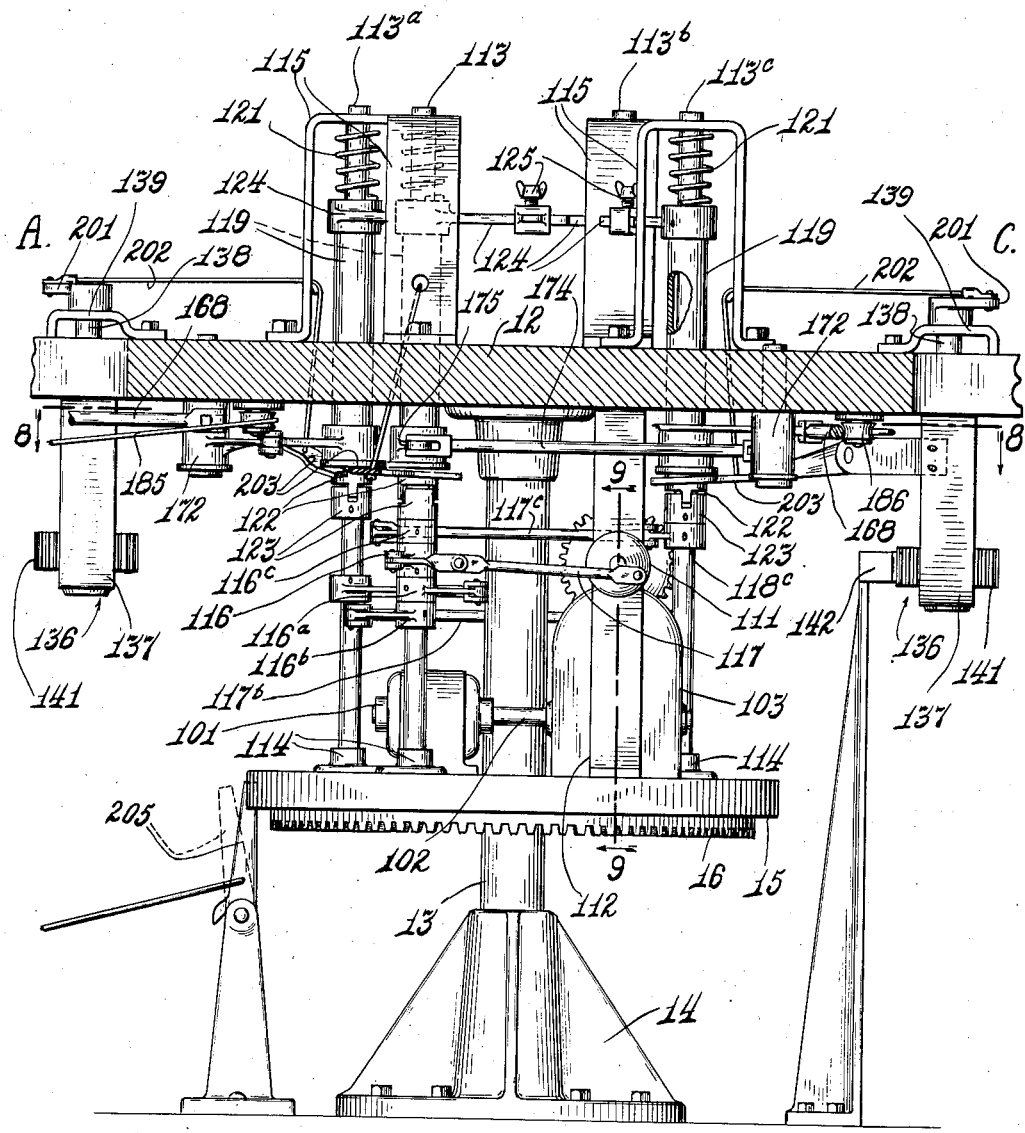

Oct. 3, 1939.  L. GUGALA  2,174,721
AUTOMATIC MACHINE FOR BEVELING GLASS
Filed April 2, 1938   9 Sheets-Sheet 7

Inventor.
Louis Gugala.
Daniel Brennan
Attorney.

Oct. 3, 1939.  L. GUGALA  2,174,721
AUTOMATIC MACHINE FOR BEVELING GLASS
Filed April 2, 1938  9 Sheets-Sheet 8

Inventor.
Louis Gugala.
Daniel Brennan
Attorney.

Oct. 3, 1939.　　　　　　L. GUGALA　　　　　　2,174,721
AUTOMATIC MACHINE FOR BEVELING GLASS
Filed April 2, 1938　　　　9 Sheets-Sheet 9
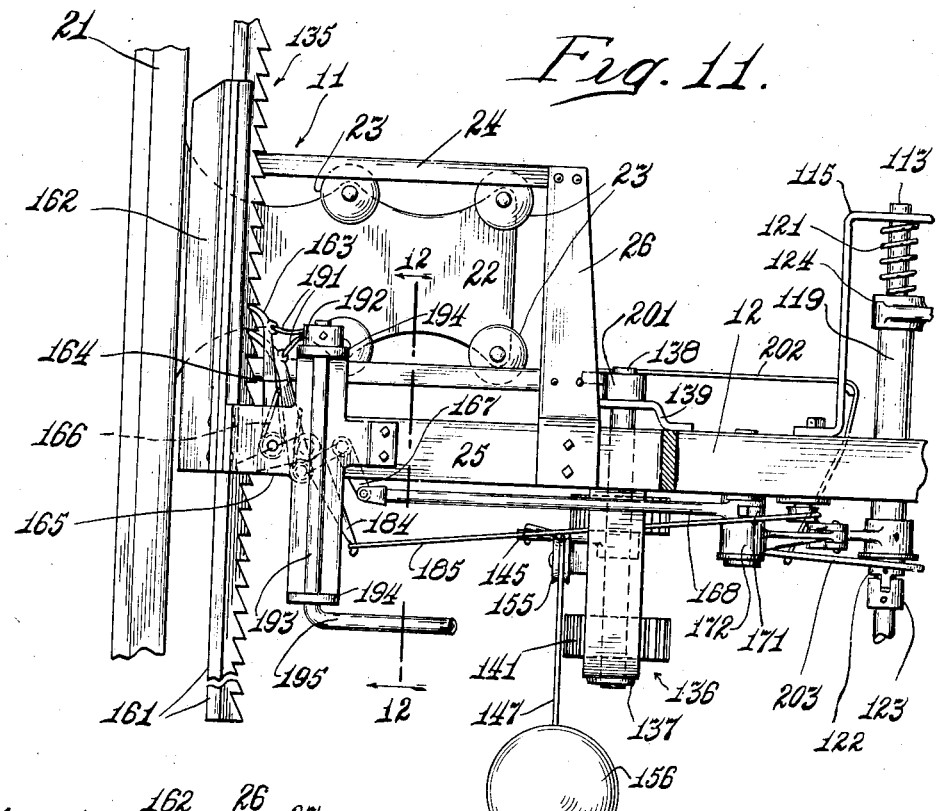
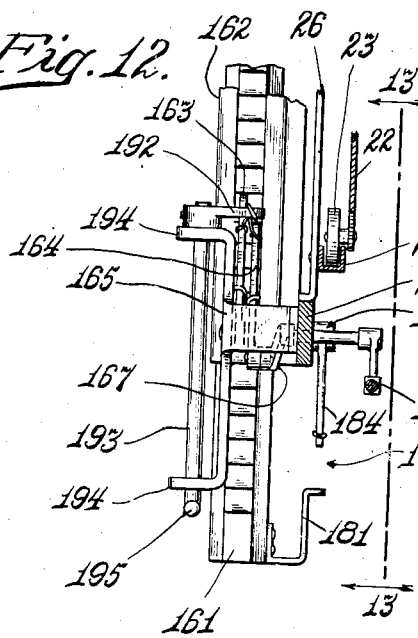
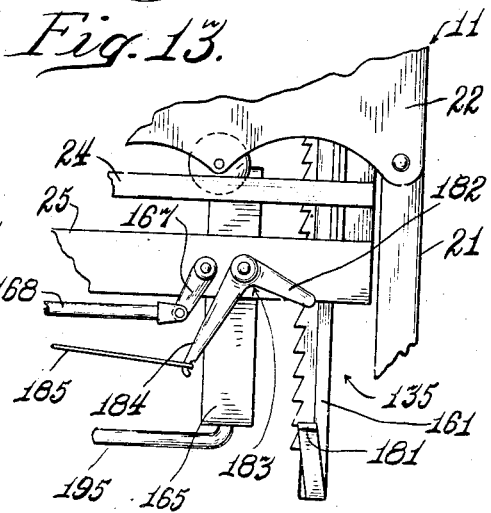
Inventor
Louis Gugala
Daniel Brennan
Attorney.

Patented Oct. 3, 1939

2,174,721

UNITED STATES PATENT OFFICE 2,174,721

AUTOMATIC MACHINE FOR BEVELING GLASS

Louis Gugala, Ludington, Mich.

Application April 2, 1938, Serial No. 199,599

15 Claims. (Cl. 51—134)

This invention relates to improvements in grinding machines and more particularly to an automatic apparatus for beveling glass plate, which includes a plurality of work-holding units operated from a common source of power and individually timed to be independently disassociated automatically from said source of power as various steps of the grinding operations are completed.

An object of the invention is to provide an automatic apparatus that will grind and polish a bevel edge on circular or polygonal glass plate.

Another object is to provide an automatic glass plate grinding and polishing apparatus with automatic independently actuated timing mechanism for each operation.

Another object is to provide an automatic grinding and polishing apparatus with novelly constructed workholding means.

Another object is to provide an apparatus of the character described with novel operable means to locate a glass plate in the workholder.

Another object is to provide an apparatus of the character described that will more quickly and efficiently bevel glass plate accurately and at less cost than known prior devices.

The foregoing and such other objects of the invention as will appear hereinafter as the description proceeds will be more readily understood from a perusal of the following specification, reference being had to the accompanying drawings, in which:

Fig. 7 is a sectional view taken on line 7—7 of Fig. 8, showing parts in elevation.

Fig. 11 is a fragmentary side elevational view of one of the workholding units showing one of the timing mechanisms in elevation.

Fig. 12 is a vertical sectional view taken on line 12—12 of Fig. 11.

Fig. 13 is a view taken substantially on line 13—13 of Fig. 12.

Figure 1:
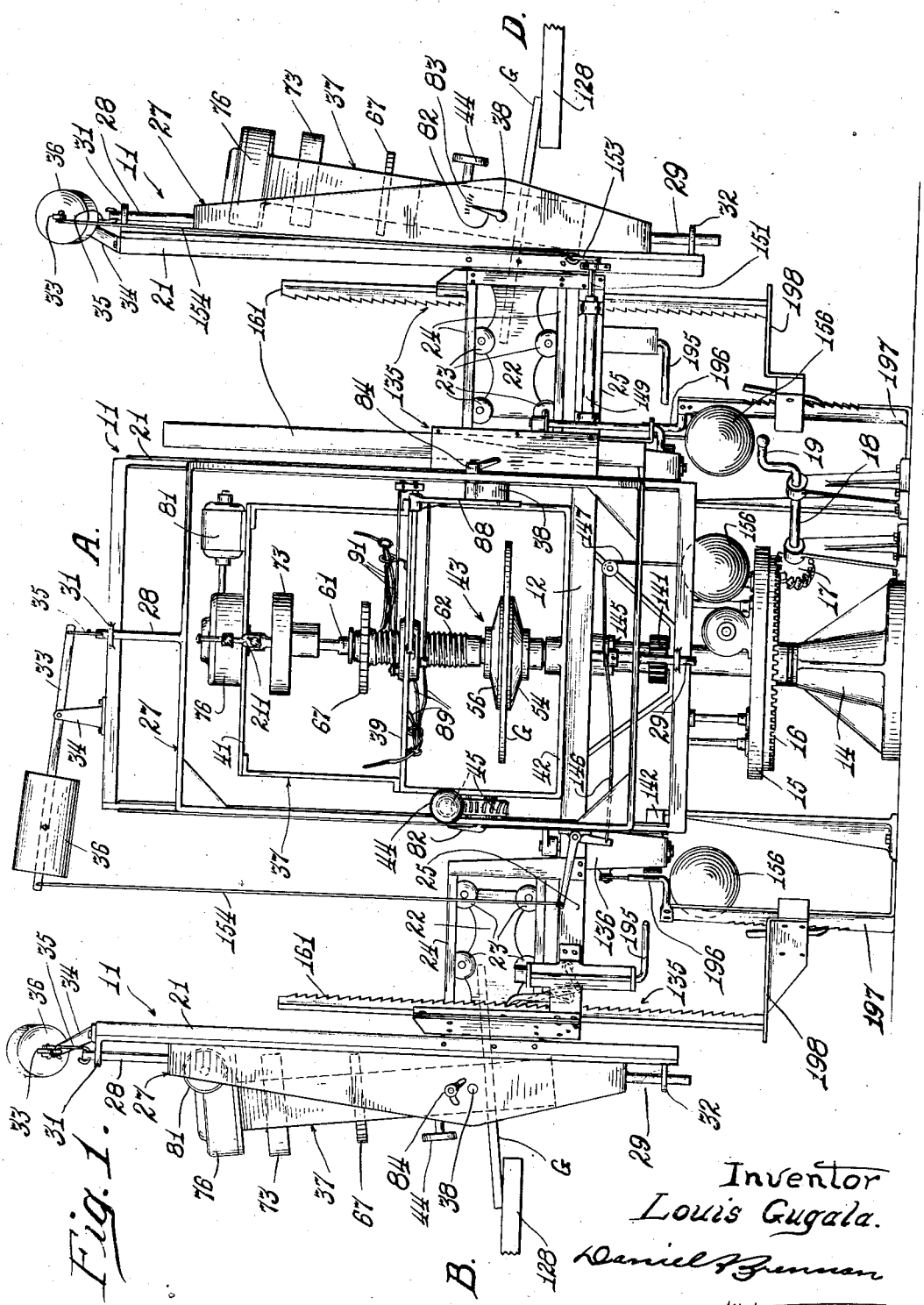
Fig. 1 is a front elevational view of the grinding apparatus.
Figure 2:
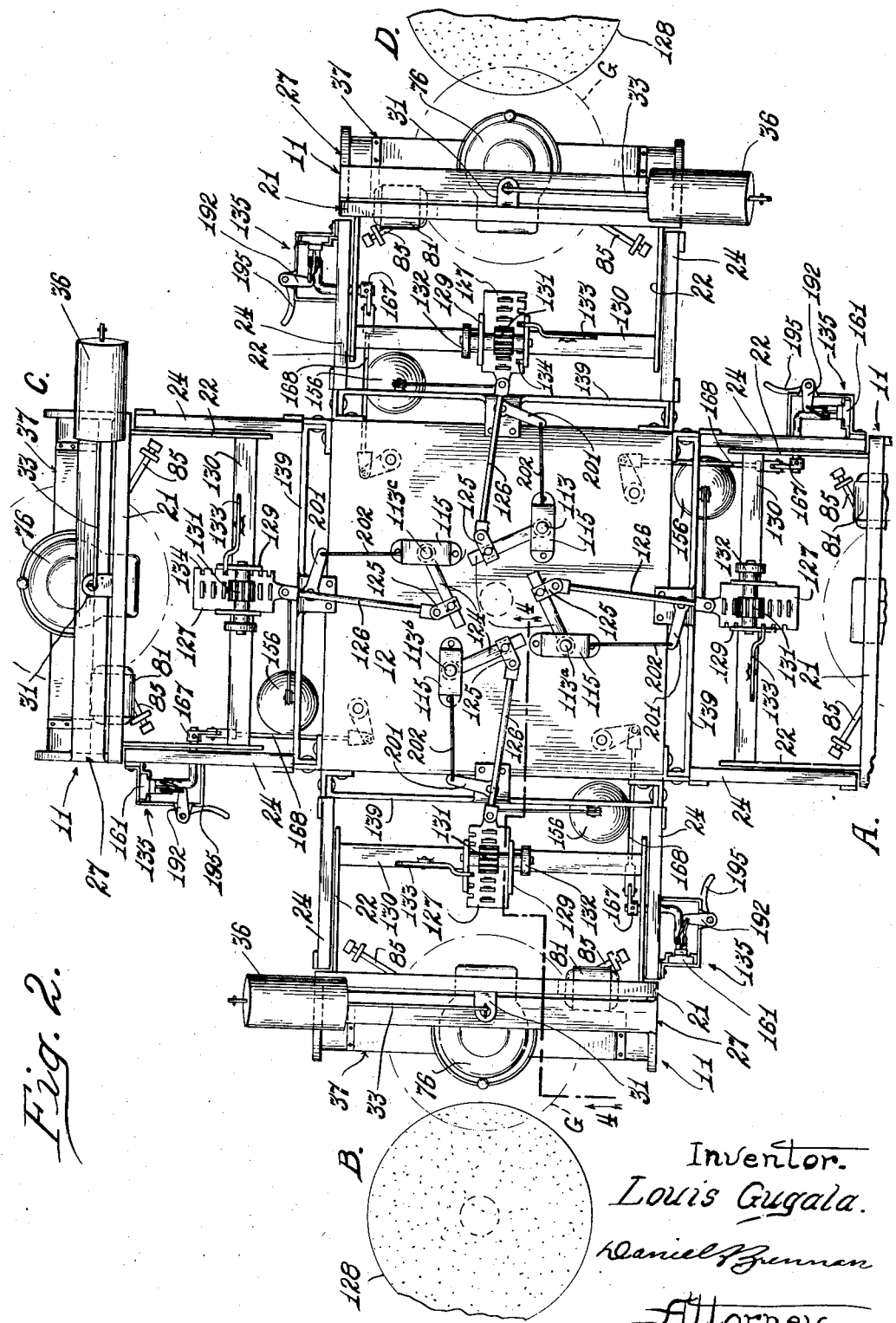
Fig. 2 is a plan view of the apparatus showing a portion of one of the workholding units broken away.

The apparatus for beveling glass plate is particularly designed to be wholly automatic in operation, the work to be serviced by a single attendant whose only duty consists in removing a finished glass plate and inserting a new one, as well as stopping and starting the machine as required. Because accurate and efficient beveling of glass plate requires that such plate be first subjected to rough grinding, then fine grinding and finally polishing, it is essential that any wholly automatic machine includes what will be termed four stations or positions of operation. In the description to follow, these stations will be identified by the letters A, B, C and D. Station A will be termed the servicing station, station B the rough grinding, station C the fine grinding and station D the polishing stations. As the operations performed at each station are the same except as to the operating time which determines the extent of the grinding operation, the improved mechanism, as best illustrated in Figs. 1 and 2, includes four like workholding units 11. These workholding units, one of which will be described in detail hereinafter, are arranged one on either side of a turntable 12 which preferably is square. The turntable 12 is supported on the upper end of a vertical shaft 13 rotatably mounted in a bearing boss 14 which is bolted or otherwise secured to the floor. Also mounted on the shaft 13 spaced below the turntable 12 and connected thereto so as to be rotatable therewith, is a platform 15 preferably having a ring gear 16 at its bottom face with which meshes a pinion 17 mounted upon a horizontal shaft 18 having an operating handle 19 on its other end. Rotation manually of the shaft 18 turns the platform 15 and likewise the shaft 13 and turntable 12 and in this manner the various work holding units 11 are moved progressively from one station to the next succeeding station during the grinding and finishing operations. Although hand operation of the turntable is preferable it is obvious that suitable power operated means could be provided for this purpose.

*Workholding units*

As previously mentioned, each of the workholding units 11 are identical and, as best shown in Figs. 1, 2, 3 and 4, each unit includes a substantially rectangular supporting frame 21 arranged in a vertical position and having two rearwardly extending parallel spaced apart plates 22, one on each longitudinal side thereof, each of which carries guide rollers 23. These rollers are guided in suitable tracks preferably formed by opposed channels 24 which are rigidly attached to horizontal arms 25, extending beyond one edge of the turntable 12, by vertical supports 26. This type of mounting permits limited horizontal movement of the frame 21 inwardly and outwardly, relative to the turntable 12 and prevents tilting of said frame out of its vertical plane. The mechanisms to cause such reciprocable movement of this frame and the purpose thereof will be more fully described hereinafter.

The outside longitudinal vertical edges of the frame 21 preferably are channeled to embrace the rear edges of the vertical walls, respectively, of a vertically slidable carriage 27. The carriage 27 also preferably is in the form of a substantially rectangular frame and has axially aligned guide pins 28 and 29 extending upwardly and downwardly, respectively, from the top and bottom horizontal walls of said carriage 27. These axially aligned pins serve to guide the carriage 27 during its vertical movement and, to this end, the pin 28 extends through an apertured lug 31 projecting from the horizontal top wall of the supporting frame 21, and the pin 29 extends through an apertured lug 32 on the horizontal bottom wall of the frame 21.

A lever 33, pivoted near one end to a bracket 34 mounted on the horizontal top wall of frame 21, has one of its free ends connected by a link 35 to the protruding end of guide pin 28. The other end of the lever 33 receives a counterweight 36 which is adjustable therealong. The counterweight 36 normally is overbalanced by the weight of the carriage 27 and the parts carried therein (which will be described hereinafter) so that the carriage normally rests in its lowermost position on the vertical supporting frame 21.

A tiltable workholder frame 37 is mounted, adjacent its lower end as at 38, inside the carriage 27. This tiltable frame also preferably is substantially rectangular, as best shown in Fig. 1, and includes an intermediate horizontal bridge 39 which together with the horizontal top and bottom walls 41 and 42, respectively, provide journals to receive a centrally located workholder mechanism indicated generally at 43 (Fig. 1). The frame 37 is readily moved into any angular position relative to the carriage 27 upon manipulation of a hand wheel 44 which operates through worm gears 45, one of which is carried on the mounting at 38.

The workholder

Figure 4:
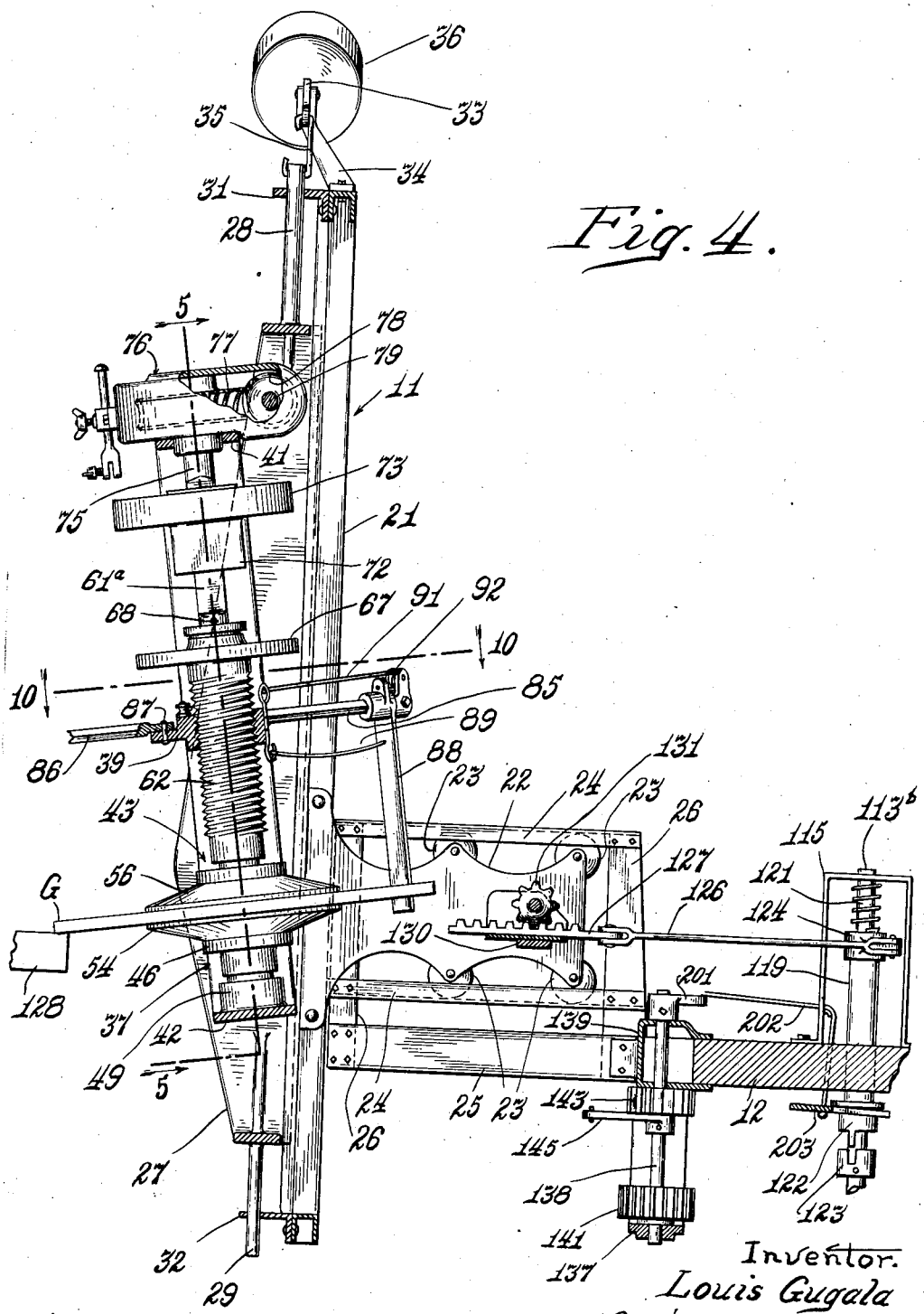
Fig. 4 is a vertical sectional view taken substantially on line 4—4 of Fig. 2, showing parts in elevation.
Figure 6:
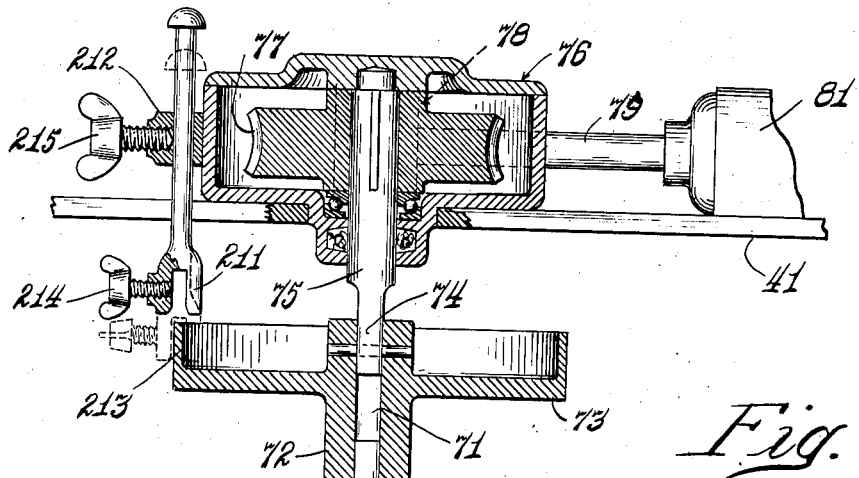
Fig. 6 is a horizontal sectional view taken substantially on line 6—6 of Fig. 5.
Figure 5:
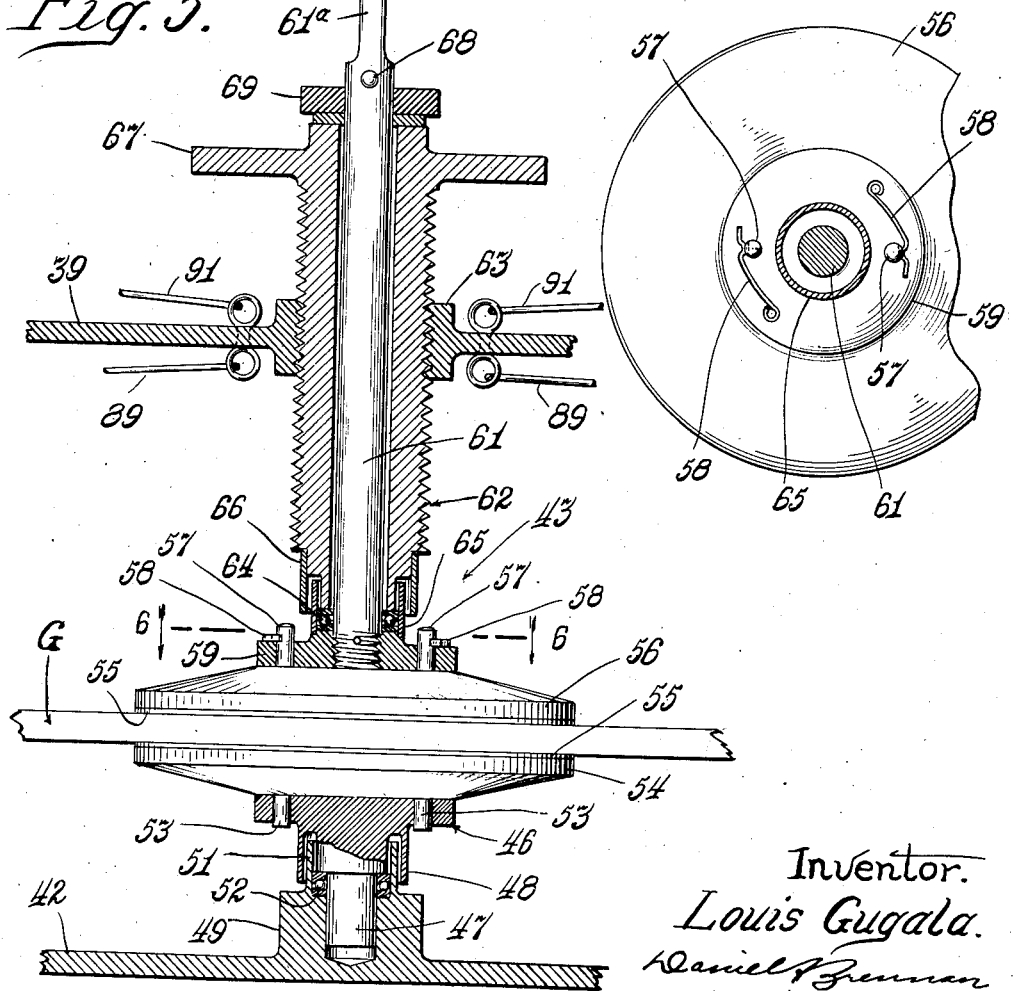
Fig. 5 is a vertical sectional view through the work holder, taken on line 5—5 of Fig. 4, but showing parts in elevation.

Referring more particularly now to Figs. 4, 5 and 6, the workholder mechanism 43 includes a radially flanged trunnion 46 having a reduced diameter 47 and an external circumferential flange 48. The trunnion 46 is suitably journaled in a bearing boss 49 on the bottom wall 42 of the tiltable frame 37. A flange 51 on said boss extends upwardly inside the trunnion flange 48 so as to provide a dust and dirt proof guard for the anti-friction bearing 52 therein. The radial flange on the trunnion 46 is suitably apertured to receive pins 53 depending from the bottom face of a circular clamp plate 54, the upper face of which has a suitable resilient facing, such as rubber 55.

The glass plate G, to be beveled, is adapted to be placed upon the resilient facing 55 and a complemental clamp 56 also having a resilient facing 55 is adapted to be brought down tightly against the top of the glass plate to secure it in place. The top clamp 56 is detachably secured by pins 57 and springs 58 (see Fig. 6) to a collar 59 threaded or otherwise secured to the lower end of a rotatable shaft 61 mounted in axial alignment with trunnion 46. An externally threaded sleeve 62 is fitted over the shaft 61 above collar 59 and is threaded through a boss 63 on the intermediate horizontal bridge 39 of the tiltable frame 37. A thrust bearing 64 is inserted between the collar 59 and the lower end of sleeve 62 and is suitably protected by telescoping flanges 65 and 66 mounted, respectively, on collar 59 and the lower end of the externally threaded sleeve 62. The upper end of the sleeve 62 has an external flange forming a hand wheel 67 whereby said sleeve may readily be rotated manually to move it vertically through the threaded boss 63.

A cotter pin 68 extending through the shaft 61 adjacent the upper end of the sleeve 62, retains a collar 69 in abutment with the upper end of said sleeve whereby, upon screwing the sleeve upwardly or downwardly, the shaft 61 is likewise moved vertically. In this manner the top clamp 56 is moved into and out of clamping engagement with the glass plate G, and is freely rotatable within said sleeve.

The portion of shaft 61, extending above the pin 68, is flattened on two sides to provide, in cross section, a substantially rectangular shaft portion 61a which extends into a similarly shaped axial opening 71 in the boss 72 of a circumferentially flanged collar 73. The upper end of the rectangular opening 71 in boss 72 receives the flattened end 74 of a driven shaft 75 which extends downwardly from a gear box 76 mounted upon the upper side of the tiltable frame top wall 41. Mounted within the gear box 76 and keyed to the shaft 75 is a worm gear 77 which meshes with a worm 78 carried on one end of the drive shaft 79 of motor 81. From the foregoing it is obvious that upon operation of the motor 81 the shafts 75 and 61 are rotated in unison to rotate the glass plate G, and, due to the sliding connection between the shaft portion 61a and the boss 72, the shaft 61 may readily be moved vertically as required.

Figure 3:
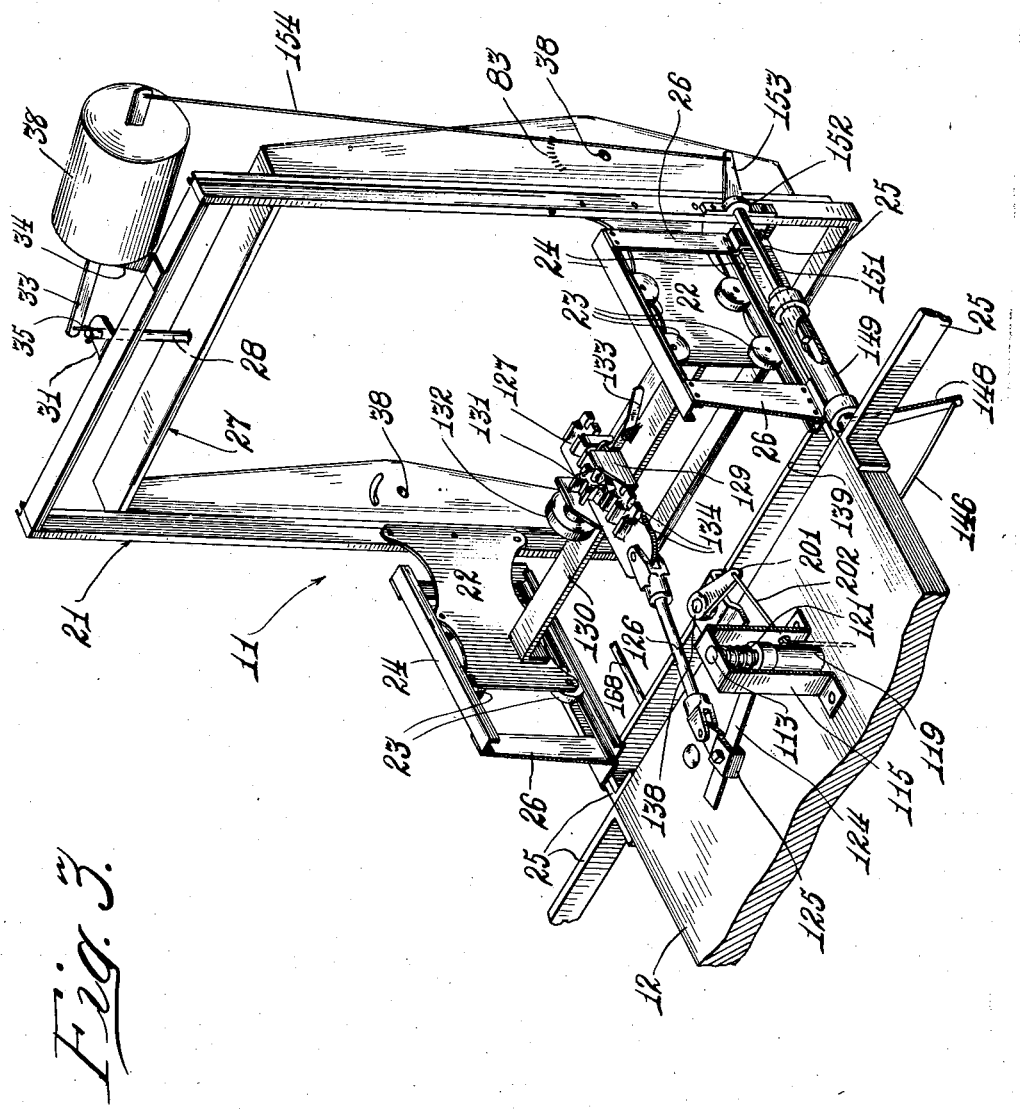
Fig. 3 is a fragmentary skeleton view, in perspective, of the reciprocal supporting frame mounting and the vertically slidable carriage mounted on said frame.

As previously mentioned, the tiltable frame 37 is journaled at 38 in the vertical walls of carriage 27 and, as best shown in Figs. 1 and 3, an index pointer 82 is carried on one of the trunnions, on the outside of the carriage 27, to co-act with suitable markings 83 on said carriage to indicate the angle of adjustment. The tiltable frame is secured in such adjusted position by tightening the nut 84, as best shown at the left hand side of Fig. 1, to clamp said frame to the carriage. In operation, the tiltable frames 37 are set at identical angles so that the bevel on the glass is uniformly ground or polished at each station.

Work centering mechanism

Figure 10:
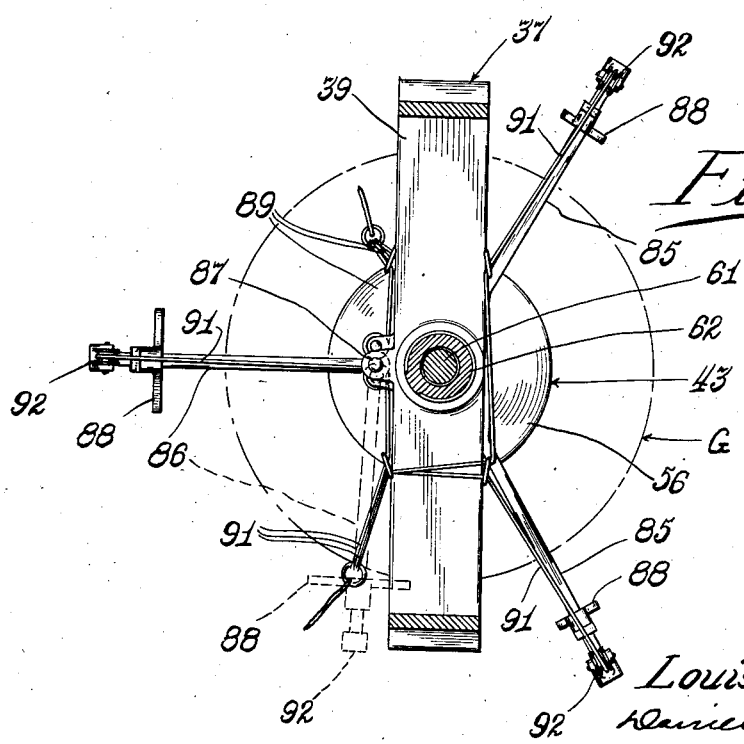
Fig. 10 is a horizontal sectional view taken on line 10—10 of Fig. 4.

Fig. 10 best illustrates the means preferably employed for centering a circular glass plate between the clamps 54 and 56. As shown, three radial arms, preferably square in cross section and spaced 120 degrees apart are provided, two of which, as at 85, are rigidly secured to the intermediate horizontal bridge 39 of the tiltable frame 37. The third arm 86 extends to the front of the unit and is pivotally mounted at 87 to the bridge 39 so that it may be swung from its position of use as shown in full lines substantially into the dotted line position shown, while the grinding operation is taking place. Slidably mounted upon each of the arms 85 and 86 is a finger piece 88 which depends therefrom (see Fig. 4) a sufficient distance to engage the edge of a circular glass plate when said fingers are moved uniformly toward their common center. Uniform movement of these fingers inwardly radially is effected by simultaneous manipulation of cords 89 one of which is attached to each finger piece. After the glass plate has been centered and clamped, another group of cords 91 is pulled, which cords are trained over suitable pulleys 92 mounted one on the end of each arm 85 or 86 for drawing the finger members to the outer extremities of said arms, as shown in Fig. 10.

When a polygonal glass plate is to be beveled only the centering finger 88 on the arm 86 is moved to insure alignment of the edge to be beveled. In this type of operation the workholder is not rotated but on the contrary is securely locked, by means to be described hereinafter, to retain the glass plate in its position of alignment as determined by the finger 88.

Reciprocating mechanism

The means for positively reciprocating each of the workholding units 11 in unison, while beveling circular or polygonal glass plates, is best shown in Figs. 2, 7, 8 and 9. A suitable motor 101 is mounted upon the platform 15 and has its shaft 102 extending into a journal box 103. A worm 104 (Fig. 9) is carried on the end of said shaft which meshes with a worm gear 105 carried on a stud shaft 106 having on its extended end a pinion 107. The pinion 107 meshes with a gear 108 carried on one end of a horizontal shaft 109, the other end of which carries an eccentric 111. The shaft 109 is journaled in suitable vertical standards 112 (Fig. 9) which are rigidly secured at their opposed ends to the platform 15 and the turntable 12. A plurality of vertical shafts 113, 113a, 113b and 113c, have their lower ends journaled respectively in suitable bearings 114 on the upper face of platform 15. Each of said shafts extends through the turntable 12 and each has its upper end journaled in one of a like number of inverted U-shaped brackets 115 mounted on the upper face of the said turntable.

Figure 8:
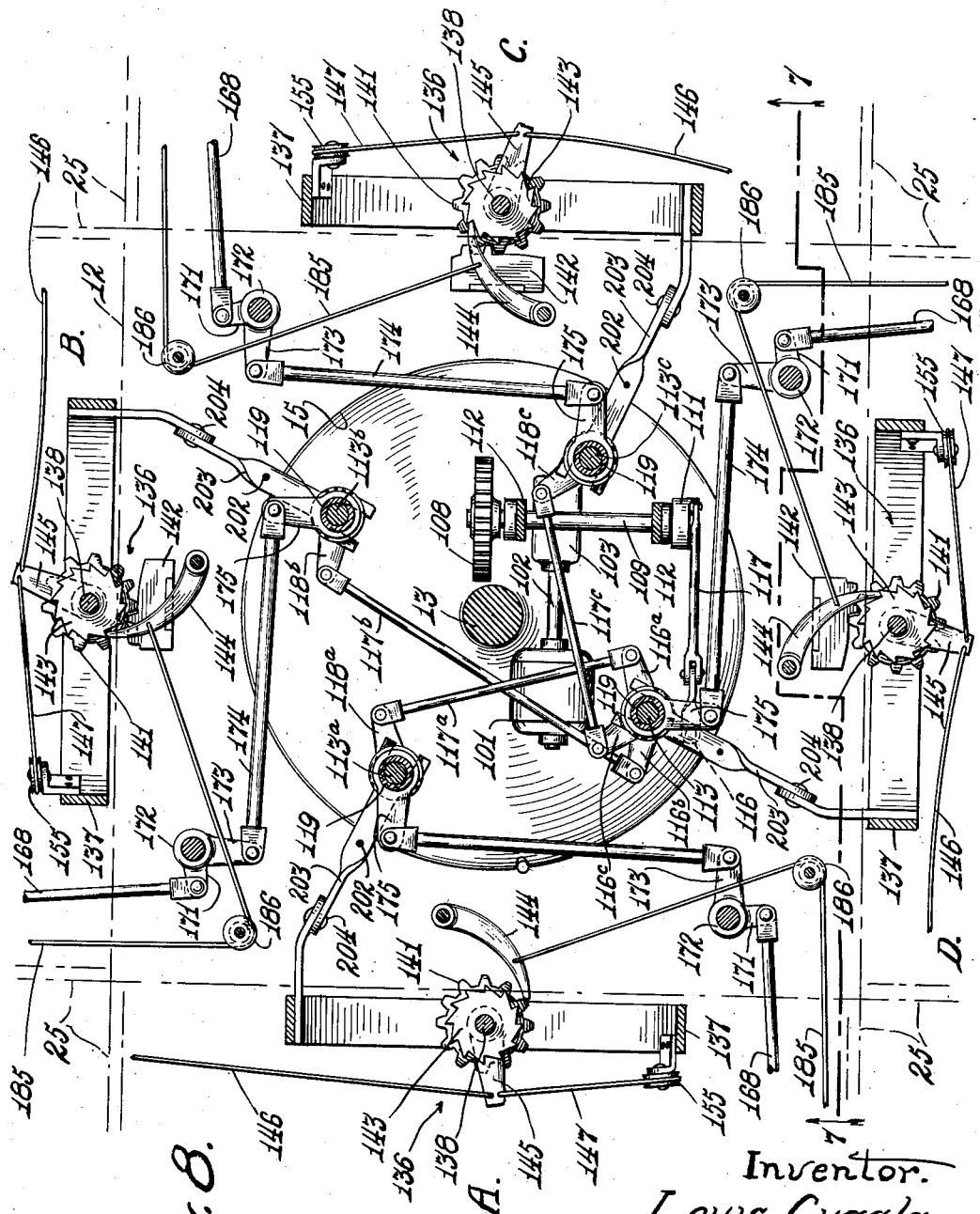
Fig. 8 is a sectional plan view taken on line 8—8 of Fig. 7.
Figure 9:
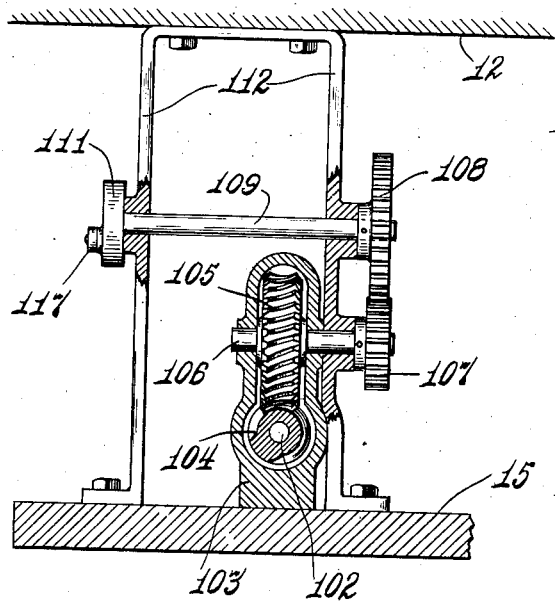
Fig. 9 is a vertical sectional view taken substantially on line 9—9 of Fig. 7.

The vertical shaft 113 carries an arm 116 which is operatively connected by a link 117 to the eccentric 111 whereby said shaft 113 is oscillatably rotated while the motor 101 is in operation. Similar arms 116c, 116a and 116b are also securely mounted on said vertical shaft 113, as best shown in Figs. 7 and 8. A link 117c is connected at one end to the arm 116c and its other end is pivotally secured to the end of an arm 118c rigidly secured to the shaft 113c. A link 117a connects the arm 116a with an arm 118a secured to the shaft 113a and, the arm 116b on shaft 113 is connected by link 117b to the free end of an arm 118b secured to the shaft 113b. By means of these link connections each of the shafts 113, 113a, 113b and 113c is oscillatably rotated in unison.

Each shaft 113, 113a, 113b and 113c has an identical sleeve 119 freely slidable and rotatably mounted thereon which sleeves each extend upwardly through the turntable 12 and have their upper ends co-acting with the respective tension spring 121 inserted between the bridge portion of the associated U-shaped bracket 115 and the end of the respective sleeve 119. The lower extremity of each sleeve 119 carries a male clutch element 122 for normal engagement with complemental female clutch elements 123 one of which is rigidly secured to each shaft 113, 113a, 113b and 113c.

As best shown in Figs. 2, 3 and 7, the upper end of each sleeve 119 carries an arm 124 having a link connector 125 adjustable therealong. Links 126 each have one end connected to one of the link connectors 125 and the free end of each is pivotally connected on to one of a plurality of racks 127 one of which is adjustably mounted in each work holding unit 11.

Accordingly, when all of the clutch elements 122—123 are in engagement, the sleeves 119 rotatably oscillate in unison with the uniformly oscillating shafts 113, 113a, 113b and 113c thus moving the frames 27 and the parts carried thereon reciprocably inwardly and outwardly radially. This movement of each of the workholding units 11 is necessary so that the glass plate G does not continuously ride along the same portion of the associated grinding wheel 128 and hence avoids grooving said wheel.

Inasmuch as this apparatus is designed to grind from ten to thirty sizes of glass plate it is necessary that the various units 11 have a variable reciprocable movement. To this end means is provided whereby the range of reciprocation may readily be varied from approximately 1½ inches to about 7½ inches.

As best shown in Figs. 2, 3 and 4, each rack 127 is slidably mounted in a suitable U-shaped bracket 129 carried on a cross arm 130 secured between the carriage roller plates 22 of the respective unit. A pinion 131 is journaled in the vertical walls of the bracket 129 and meshes with the teeth on the associated rack. A thumb nut 132 is secured to a protruding end of the trunnion of each pinion 131 whereby each pinion may be manually rotated to move the associated rack longitudinally in the bracket 129 thus varying the length of the operating connection between the work holding unit and the respective actuating arm 124 on the associated sleeve 119. The racks 127 are readily locked in any position of adjustment by means of latches 133, one being associated with each rack to co-act with one of a plurality of lateral notches 134 extending inwardly from one edge of each rack. Additional adjustment is made by shifting the link connectors 125 into different positions of adjustment on their respective arms 124.

Carriage elevating mechanism

While the grinding or polishing operations are taking place at the stations B, C and D the workholding carriages 27 are in what will be termed their lowered position so that the glass plate G rests upon the respective grinding wheel 128. Immediately upon sufficient grinding being effected at either station the carriage at that station is elevated to lift the work off from the grinder. This vertical sliding movement of the carriages 27 is effected automatically and includes suitable timing mechanism, indicated generally in Fig. 1 at 135, and trip mechanism 136, best shown in Figs. 4, 7 and 8. One timing mechanism 135 and one trip mechanism 136 is associated with each of the work-holding units 11 and in the interest of clarity the parts of each will be identified by the same numerals and, as each is identical with the other, only one of the sets of mechanisms will be described in detail.

Tripping mechanism

The tripping mechanism is carried beneath the turntable 12 in a suitable bracket 137. A vertical shaft 138 has its lower end journaled in said bracket and its upper end extends upwardly through a bearing strap 139 carried on the turntable. The shaft 138 carries a pinion 141 which, during certain phases of the operation, is adapted to engage a fixedly mounted segment 142 whereby said shaft is partially rotated. A ratchet 143 also is carried by the shaft 138 whereby said shaft is held in its partially rotated position by a spring pressed locking pawl 144 associated therewith. An arm 145 is secured to and extends from the shaft 138 and has connected to its ends two cables 146 and 147.

The cable 146 extends transversely to one side of the turntable, as best illustrated in Fig. 3 and has its end secured to a lever 148 depending from a rock sleeve 149 (squared internally) carried on the outside face of one of the turntable straps 25. One end of a squared shaft 151 is slidable within said sleeve and is rotatably journaled, at 152, to the outside face of the vertical supporting frame 21. An arm 153 is secured to the free end of the squared shaft 151 and has its free end connected by a cable 154 to the free end of the weighted lever 33.

The other cable 147, which is connected at one end to the arm 145 on shaft 138, extends over a pulley 155 and carries a counterweight 156, as best shown in Figs. 1, 8 and 11. The operation of this tripping mechanism is substantially as follows; by reference to Figs. 3 and 8, when a unit is in the position indicated by the letter "A" (Station A), the pawl 144 is disengaged from the ratchet 143. While in this position, the combined load of the counterweight 156 and weight 36 is greater than the load of carriage 27, hence the carriage is counterbalanced and remains elevated to its uppermost position. It is at this station (A) that the attendant removes a completely ground and finished glass plate and inserts another one, having first stopped rotation of the workholder 43. This having been accomplished, the motor driven workholder 43 is started and the turntable is rotated a quarter of a turn moving the work carrying unit from the position A into the position B. As the pinion 141 on shaft 138 engages and moves past the segment 142, said shaft is partially rotated and held in its rotated position by the spring controlled pawl 144. This partial rotation of shaft 138 slackens the cable 146 and the weight 36 is overbalanced by the load of the carriage 27 so that the carriage moves by gravity into its lowermost position to bring the work G into contact with the associated grinding wheel. As previously noted grinding will continue until after actuation of the respective timing mechanism 135 previously referred to.

Timing mechanism

One timing mechanism 135, indicated generally in Fig. 1, and best shown in Figs. 8, 11, 12 and 13 is provided on each workholding unit 11 and, as in the description of the tripping mechanism, only one of these timing mechanisms will be described in detail; like numerals identifying like parts of each mechanism.

Referring specifically to Figs. 11, 12 and 13, the timing mechanism includes a rack bar 161 vertically slidable in a bracket 162 mounted on one side of the workholding unit 11. This rack is adapted to have an intermittent or step by step movement upwardly during the operation of the apparatus and, to this end, a holding pawl 163 and a feeding pawl 164 are provided. The holding pawl 163 is journaled to a suitable bracket 165 carried on the outside face of one of the turntable straps 25, and normally is held in engagement with the rack teeth by a spring 166.

The feeding pawl 164 is carried on one arm of a bell crank 167 extending through the strap 25. The free end of the other bell crank arm is connected by link 168 to one arm 171 of another bell crank 172 journaled on the bottom face of the turnable 12, as best shown in Figs. 11 and 8. The other arm 173 of the bell crank 172 is connected by link 174 to an arm 175 extending outwardly from and rigidly secured near the lower end of the respective sleeve 119 mounted on one of the vertical shafts 113. Hence, it is obvious that when the sleeve 119 is being oscillatably rotated by operation of the motor 101 to horizontally reciprocate the workholding unit, the rack feeding pawl 164 is actuated to elevate the rack bar 161 intermittently.

Fixedly secured to and extending inwardly and upwardly from the lower end of the rack bar 161 is a stop arm 181. When the rack bar reaches its uppermost position the stop arm 181 engages one arm 182 of a trip lever 183 journaled to the inside face of one of the straps 25. The other arm 184 of said lever is connected to one end of a cable 185. Referring now to Fig. 8, the cable 185 is shown trained over a pulley 186 on the under face of the turntable, and its other end is secured to the locking pawl 144. Movement of the trip lever 183, upon its being engaged by the stop arm 181, pulls the locking pawl 144 out of engagement with the ratchet 143 and it is in this manner that the counterweight 156 is added to weight 36 to elevate the carriage and terminate the grinding operation. The duration of time during which the grinding is taking place is determined by the distance the rack bar 161 must travel before the stop arm 181 engages and trips the trip lever 183.

Rack Bar Release

As previously noted, a holding pawl 163 is provided to retain the rack bar in any position of rest during and after its reaching its uppermost position. Said bar is released automatically and falls by its own weight when the turntable is turned to position the work-holding units at their next succeeding station. To accomplish this the pawls 163 and 164 are connected by flexible cords 191 to a finger 192 carried on the upper end of a trigger rod 193. The rod 193 is journaled vertically in spaced ears 194 provided on the bracket 165 and its lower end is turned substantially horizontally to provide a trigger finger 195. While the apparatus is being rotated to position the various units 11 at stations B, C or D the trigger finger 195 engages a rigid arm 196 (see Fig. 1) mounted on the upper end of vertical standard 197 arranged in the path of said finger. This engagement turns the trigger rod 193 and pulls both pawls out of engagement with the rack bar and said bar drops onto a vertically adjustable plate 198 carried on the standard 197.

Accordingly, the position of the plate 198 on standard 197 determines the distance to which the rack bar 161 drops, which in each instance is its starting position, and, as said plate may readily be adjusted vertically, the time interval required before said rack bar reaches its uppermost position to actuate the spring controlled pawl 144, is readily varied to suit the type of grinding being conducted at any one of the stations. Because no grinding takes place at the station A (attendant's position) no standard 197 with its arm 196 and plate 198 is provided at this point nor is any segment 142 provided at this station.

Clutch mechanism

When the glass plate is elevated above the grinder, reciprocable movement of the frame and operation of the timing mechanism ceases as to that unit. The mechanism to accomplish this is the same in each unit and is illustrated in Figs. 2, 3 and 11. As best shown in Fig. 11, an arm 201 is fixedly secured to the upper end of the vertical shaft 138. A cable 202 connected with the free end of said arm, extends substantially horizontally through an opening in the U-shaped bracket 115 of the asssociated operating mechanism, then downwardly through the turn-table to have its free end connected with a clutch operating arm 203. This cord remains slack while grinding is being done. The arm 203 is pivotally secured at one end, as at 204 (see Fig. 8) and has its forked other end engaged around the associated male clutch element 122. Accordingly, when the locking pawl 144 is disengaged from the ratchet 143, to elevate the carriage, the ratchet and its shaft 138 return to their normal position, thus pulling the cable 202 taut and disengaging the clutch elements 122—123. This disengages the associated sleeve 119 from its source of power and reciprocation of the frame 27 and actuation of the feeding pawl 164 ceases.

Operation

The operation of this machine is simple, positive and efficient and requires the attention of but one attendant. The attendant, standing at the station A, inserts, for example, a circular glass plate G between the workholding clamps 54 and 56. He then operates the centering mechanism, best shown in Fig. 10, to place the glass plate in axial alignment with the workholder and the work is then locked in place by manipulation of the hand wheel 67 on the externally threaded sleeve 62. Suitable switches (not shown) are provided on each unit 11 to start motor 81, for rotating the glass, and motor 101 on the platform 15. He then releases a lock 205 (Fig. 7) and by operating the bell crank shaft 18—19, rotates the turntable to position the unit 11 (in which the glass plate has just been inserted) at station B.

As the unit 11 reaches this station the pinion 141 is partially rotated by momentary engagement with the associated segment 142 thus slacking cable 146 to lower the carriage 27 thereof to position the glass plate against the adjacent grinding wheel 128 and, at the same time, effecting engagement of the clutch elements 122—123 of the associated operating mechanism. The parts are held in this position of operation by the locking pawl 144.

During this movement of the unit 11 from station A to station B, the trigger finger 195 was momentarily engaged by the rigid arm 196 thus releasing the timing rack and dropping it onto plate 198. As the clutch elements 122—123 are now in engagement, the entire workholding unit 11 is being reciprocated horizontally and the timing mechanism 135 is actuating to intermittently elevate the rack 161 one notch at a time. It should be noted, at this time, that the workholding unit 11, as a whole, is reciprocated once to each two revolutions of the glass plate being bevelled. This is desirable to avoid positioning the same point of the bevel edge on the identical spot of the grinding wheel during each complete horizontal reciprocable movement, thus avoiding undue wear and insuring uniform beveling over the entire circumferential edge of the glass.

When the rack 161 reaches its uppermost position, the locking pawl 144 is disengaged from its associated ratchet 143 thus adding the load of weight 156 to that of the weight 36 to elevate the carriage and carry the glass plate upwardly away from the grinding wheel. This release of the ratchet also disengages the clutch element 122 and 123 thus stopping reciprocation and halting actuation of timing mechanism.

While the grinding is taking place at station B, the attendant inserts a glass plate in the unit 11 now resting at the station A and, this having been accomplished and the grinding operation at station B having been completed, he again rotates the turntable to carry the glass plate just inserted, into station B and the one just ground at station B, into position at station C where the same operations of each unit are repeated. The glass plate, bevelled at station B, is given a finished grinding at station C. While the rough grinding is being performed at station B and the finished grinding is taking place at station C, the attendant is inserting another glass plate into the unit now resting at station A. Having done this, and the carriages at stations B and C having been elevated upon the completion of the grinding at said stations, he again rotates the turntable to position the newly inserted glass plate at the station B; the rough ground glass plate from station B, at station C, and the finish-ground glass from station C into station D where it is polished. Upon the completion of the rough grinding at station B, finish-grinding at station C and polishing at station D and insertion of a new glass plate in the unit resting at station A, the apparatus is again rotated to move each unit into the next successive station. This positions the completed glass plate from station D at the original starting point, or station A. The attendant removes this bevelled glass plate and inserts a new piece while the grinding and polishing is taking place at the other three stations as before. These operations are repeated, the attendant removing the finished glass plates and inserting new plates as each unit 11 returns to its position of rest, station A. It is apparent that inasmuch as the grinding and polishing operations at each of the various stations B, C and D are for different periods of time, the separate clutch mechanism 122—123 is necessary for each unit.

When a polygonal glass plate is inserted in the workholder, the motor 81 is not operated and, as previously stated, only the front centering arm 86 and finger 88, which is wider than the fingers on the other arms 85, is employed to set the glass plate. While the finger 88 is held tightly against the front edge of the glass plate, the workholding unit is locked against rotation to insure proper alignment of said edge with the grinding wheel. This locking is effected by a vertically adjustable yoke 211 (Figs. 4 and 5) which yoke is moved into engagement over the circumferential flange 213 on the collar 73. Winged set screws 214 and 215 secure this engagement. In Fig. 5 the adjustable yoke 211 is shown in a position substantially 90° from its true location as shown in Fig. 4, for the purpose of illustration only.

Having specifically described the improved apparatus and shown various parts in detail in the accompanying drawings, it is to be understood that the specific structure of the various parts thereof are illustrative merely and not restrictive and it is not desired that the invention be restricted to the precise details of construction

I claim:

1. In an apparatus for beveling glass plates, the combination with a grinding wheel, of a mounting, means on said mounting to hold a rotatably driven glass plate angularly against the grinding wheel, said means including a reciprocable supporting frame and a slidable carriage, power operated mechanism to reciprocate said frame, timing mechanism, and means actuated by said timing mechanism to halt reciprocation of said frame and slide said slidable carriage to terminate the beveling of the glass plate.

2. In an apparatus for beveling glass plates, the combination with a grinding wheel, of a turntable, means on said turntable to hold a glass plate, said means including a reciprocable supporting frame and a normally elevated slidable carriage, power operated mechanism to reciprocate said frame, means operable to lower said carriage for placing the work against the grinding wheel, timing mechanism, and means actuated by said timing mechanism to halt reciprocation of said frame and elevate said slidable carriage.

3. In an apparatus for beveling glass plates, the combination with a plurality of grinding wheels, of a turntable, a plurality of glass plate holding units mounted thereon, said table being rotatable to position each of said units successively at positions of rest, rough grinding, fine grinding and polishing, means connecting each of said units with a common source of power, independent means in each unit to rotate the glass plate carried therein, a timing mechanism for each unit, and means actuated by said timing mechanism to disconnect the associated unit from the common source of power.

4. In an apparatus for beveling glass plates, the combination with grinding wheels, of a turntable, a plurality of glass plate holding units mounted thereon, said turntable being rotatable to position each of said units successively at positions of rest, rough grinding, fine grinding and polishing, means connecting each of said units with a common source of power, a clutch between each unit and said source of power, independent means in each unit operable to rotate the glass plate carried therein, individual timing mechanism for each unit, and separate means connecting each timing mechanism one with each clutch to disconnect the associated unit from the common source of power.

5. In an apparatus for beveling glass plates including a unit having a reciprocable frame, a carriage slidable in said frame, a glass plate holding power-operated mechanism mounted in said carriage, means to reciprocate said frame, means to retain said carriage with its glass plate holding mechanism in position for grinding, and timing mechanism associated with said unit operable to halt reciprocation of said frame and to slide the carriage to move the glass plate holding mechanism out of grinding position.

6. In an apparatus for beveling glass plates including automatically actuated timing mechanism for the beveling operation, said mechanism comprising, in combination, a slidable rack, a power operated feeding pawl operable to intermittently slide said rack, means operable when said rack reaches a predetermined position to stop the grinding operation and halt operation of said feeding pawl, means operable to return said rack to its initial position, and means adjustable to vary the initial position of said rack.

7. In an apparatus for beveling glass plates, a turntable, a plurality of glass plate holding units equally spaced apart on said turntable, each of said units including a reciprocable frame and a slidable carriage, means in each carriage to support a glass plate, power operated mechanism for reciprocating each of said frames, a plurality of clutches each operable independently to halt reciprocation of its associated frame, and means operable upon disengagement of a clutch to slide the associated carriage.

8. In an apparatus for beveling glass plates including a plurality of individual workholding units, a source of power, a plurality of oscillatably rotatable shafts, means connecting one of said shafts with said source of power, means connecting said one shaft with the remaining shafts for operation in unison, a sleeve on each shaft operatively connected one with each workholding unit, a clutch normally operatively connecting each sleeve with its respective shaft, and timing mechanism in each unit operable to disengage the respective clutch to render said unit inoperative.

9. An apparatus for beveling glass plates including, in combination, a turntable, a plurality of sets of tracks on said turntable, a plurality of supporting frames, one frame slidably mounted in each set of tracks, a carriage slidable on each frame, a tiltable workholder frame mounted in each carriage, means on each tiltable frame to operate a workholder mounted therein, means operable to reciprocably slide each supporting frame, a plurality of timing mechanisms one associated with each frame, and means operable upon actuation of a timing mechanism to halt movement of the associated reciprocable supporting frame.

10. In an apparatus for beveling glass plates, the combination with a grinding wheel, of a mounting, means on said mounting to hold a glass plate angularly against the grinding wheel, said means including a reciprocable supporting frame and a slidable carriage, power operated mechanism to reciprocate said frame, timing mechanism, and means actuated by said timing mechanism to halt reciprocation of said frame and slide said slidable carriage to terminate the beveling operation.

11. In an apparatus for beveling glass plates, the combination with a plurality of grinding wheels, of a support, a plurality of glass plate holding units mounted thereon, said support being movable to position each of said units successively at positions of rest, rough grinding, fine grinding and polishing, means connecting each of said units with a common source of power, timing mechanism for each unit, and means actuated by said timing mechanism to disconnect the associated unit from the common source of power.

12. In an apparatus for beveling glass plates, a turntable, a plurality of glass plate holding units equally spaced apart on said turntable, each of said units including a reciprocable frame and a slidable carriage, means in each carriage to support a glass plate, power operated mechanism for reciprocating each of said frames, a plurality of clutches, automatic means to operate each clutch independently to halt reciprocation of its associated frame, and means operable by said automatic means to slide the associated carriage.

13. In an apparatus of the character described, a plurality of workholding units including a reciprocable frame having a slidable carriage therein, a plurality of power operated oscillatably rotatable shafts, a sleeve on each shaft, a clutch normally connecting each sleeve with its respective shaft, means connecting the sleeves one to each frame to oscillate said frames, latching means one to retain each slidable carriage in a predetermined position while the associated frame is oscillating, timing means in each unit operable to release the associated latching means, and means operable upon release of said latching means to disengage the associated clutch.

14. In an apparatus of the character described, a plurality of workholding units mounted for movement into successive positions, each of said units including a reciprocable frame and a slidable carriage, a plurality of power operated oscillatably rotatable shafts, means disengageable by a clutch connecting said shafts one to each unit to oscillate the frame thereof, timing means for each unit operable to disengage the associated clutch after a predetermined period of frame oscillation, and means to cause engagement of said clutch upon movement of the unit into its next successive position.

15. In an apparatus of the character described including a support, a plurality of workholding units on said support, said support being movable to successively position said units at different positions for grinding, each of said units including a reciprocable frame and a slidable carriage, operating means therefor, a clutch connecting each unit with said operating means, timing mechanism on each unit to open the associated clutch to disconnect the respective unit from said operating means, and means operable to close said clutch upon movement of the unit into its next successive position.

LOUIS GUGALA.